United States Patent [19]

Tixier

[11] 3,752,408
[45] Aug. 14, 1973

[54] LIGHTING DEVICES WITH AUTOMATIC REGULATION

[75] Inventor: Michel Tixier, Billancourt (Hauts de Seine), France

[73] Assignees: Regie Nationale Des Usines Renault, Billancourt (Hauts de Seine); Automobiles Peugeot, Paris, France

[22] Filed: Nov. 9, 1970

[21] Appl. No.: 87,739

[30] Foreign Application Priority Data

Nov. 21, 1969 France.........................6940150

[52] U.S. Cl. ........ 240/46.05, 240/7.1 LJ, 240/41.1, 240/41.6, 350/268
[51] Int. Cl. ............................................. F21v 11/18
[58] Field of Search...................... 240/46.01, 46.03, 240/46.05, 46.23, 41.62, 44 R, 44.1, 41.6, 41.37, 41.35, 103, 41.1, 7.1 R, 7.1 LJ; 350/268

[56] References Cited
UNITED STATES PATENTS

| 1,894,876 | 1/1933 | Kuhn | 240/41.1 |
| 3,005,374 | 10/1961 | Thomas | 240/46.03 X |
| 1,490,676 | 4/1924 | Miller | 240/46.05 |

FOREIGN PATENTS OR APPLICATIONS
1,938,020   7/1970   Germany..................... 240/7.1 LJ

*Primary Examiner*—Richard L. Moses
*Attorney*—Stevens, Davis, Miller & Mosher

[57] ABSTRACT

This lighting device for automotive vehicle, adjustable by means of a control system, comprises a filament bulb located at a first focus of an elliptic mirror of revolution four of which the second focus is coincident with the focus of one fraction of a parabolic mirror of revolution disposed on one side only of a plane containing the axis of revolution of said parabolic mirror, which forms substantially a half right angle with the axis of the elliptic mirror, at least one masking element being so controlled by an actuator responsive to said control system that, being interposed substantially in said second focus, it can reduce the surface area of the real image of said filament, this device applying more particularly to automotive headlamps.

9 Claims, 4 Drawing Figures

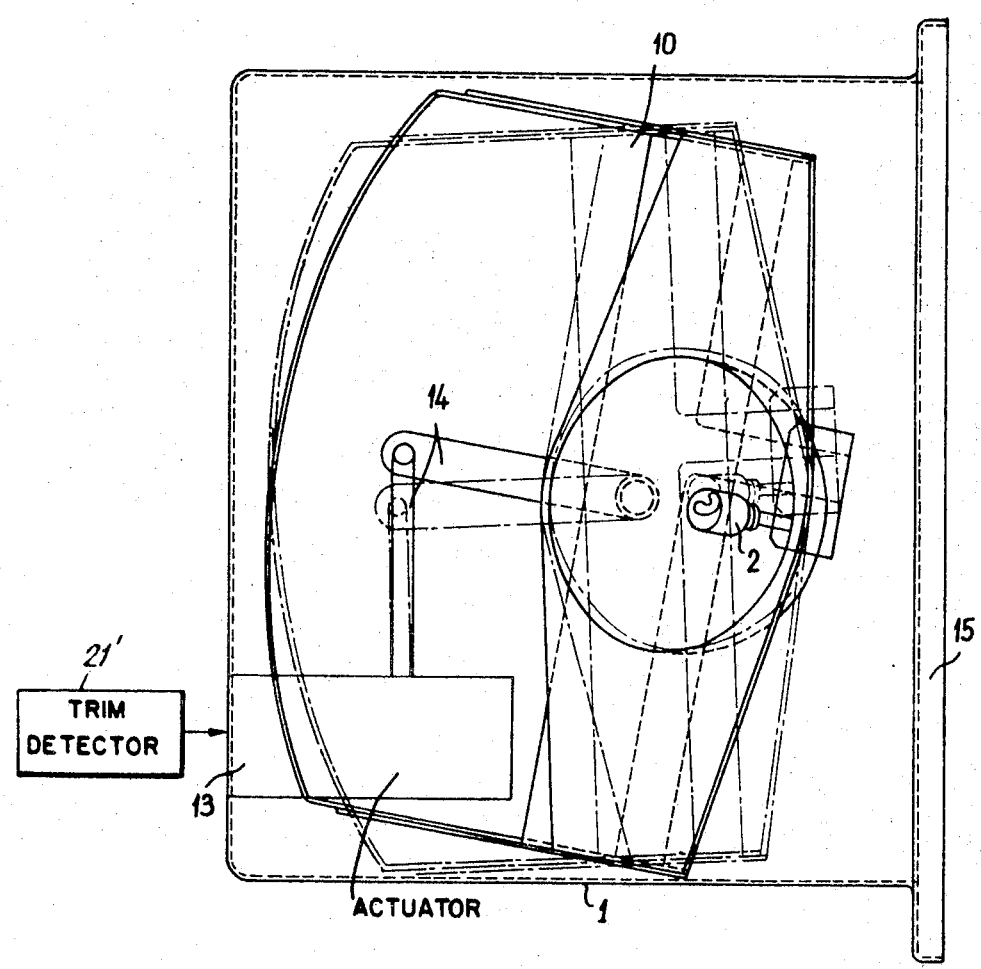

LIGHTING DEVICES WITH AUTOMATIC REGULATION

The present invention relates in general to lighting devices for automotive vehicles and has specific reference to an improved headlamp system capable of producing from the same single-filament light source both the open-road or headlamp illumination and a deflected (dipped) illumination, as well as the automatic optimum angular setting of one or both light beams as a function both of the vehicle trim and the surrounding illumination (including the illumination produced by other vehicles) to avoid any risk of dazzling the drivers of oncoming vehicles.

Many devices have already been proposed for correcting the light beams generated by headlamps as a function of the trim of the vehicle, that is, the general inclination of the vehicle with respect to the road surface. The most popular devices of this character control either the complete projector or headlamp, or the lamp (bulb) alone which is moved in relation to the reflector (generally a parabolic reflector) associated therewith, or the reflector proper, in order to provide the desired correction of the direction of the light beam.

These various correcting systems are objectionable however in that they control a considerable mass of relatively high inertia with a long response time ; alternatively, the lighting efficiency of these assemblies is inferior since the relative optimum position of the mirror or reflecting surface with its optical prisms and of the light source is not properly preserved.

It is also known to provide means for varying the angular position of the light beam emitted by the headlamp of a motor vehicle which comprises notably a light source and a reflector, by using a pivoting mirror reflecting the light emitted from said source, the movement of the mirror being controlled for instance by a system responsive to the steering system of the vehicle.

Finally, another attempt consisted in effecting the desired correction by causing a parabolic mirror to pivot in the manner described in the U.S. patent application Ser. No. 835.348 of June 23, 1969, now U.S. Pat. No. 3,629,570 the pivotal movement of the mirror being responsive either to the momentary trin of the vehicle or to a manual adjustment.

However, hitherto known propositions in this field are attended by a number of inconveniences, notably those deriving from systems utilizing an elliptic mirror of revolution in order to provide a real image, screen means, either fixed for limiting the beam or movable and controlled, for example, by a photo-electric cell, being disposed at the level of said image. But it will be noted that on the one hand these screens are not operatively connected to members responsive to the trim of the vehicle and on the other hand said systems further include lenses of relatively great dimensions for minimizing the beam divergence. As a result, these assemblies are heavy, cumbersome, costly and difficult to fit in automotive bodies.

It is therefore the essential object of the present invention to provide a lighting system for automotive vehicles which is adjustable by means of a control system. This device, which avoids the various inconveniences set forth hereinabove, is characterized in that it comprises the following component elements:

a filament bulb, an elliptic mirror of revolution having an eccentricity within the range of 0.4 to 0.6 and of which a first focus is nearer to the bottom of the mirror than the second focus, the filament of said bulb being thus substantially coincident with said first focus whereby a real image of the filament, contained in a sphere of about 10 mm or 0.4" in diameter, is formed at the other or second focus, a portion of a parabolic mirror of revolution of considerable parameter, i.e., the distance between the focus and directrix of the parabola which is of the order of 10 cm ± 5 cm (or 4 inches ± 2 inches); and disposed on one side only of a plane containing the axis of revolution of said mirror, which forms substantially a half right angle with the axis of the elliptic mirror of which the second focus is so coincident with that of the parabolic mirror that the latter reflects the light rays issuing from the real image in a direction substantially parallel to its axis of revolution, at least one masking member so controlled by an actuator responsive to the action of said control system that, when interposed substantially in said second focus, it can reduce the surface area of the real image.

The lamp or bulb may advantageously be of the halogen type.

According to this invention, the portion of the parabolic mirror may be mounted for pivotal movement about an axis passing through its focus, or alternatively the complete headlamp or projector may be pivotally mounted, the pivoting movements being also controlled by an actuator responsive to the control system proper. As a consequence, it is possible to "switch" or rather change from open-road lighting to dimmed or dipped lighting and vice-versa and also to adjust the intensity of the light beam as a function of the trim of the vehicle, by conventional means such as shown in French Pat. No. 1,587,078 the shape of the masking member being designed according to the various functions devolved thereto.

Thus, for instance, the masking member may consist either of one or a plurality of screens to which movements of translation are impressed by one or a plurality of operating members, or of a diaphragm or shutter also responsive to an operating member.

Of course, a similar result could also be obtained by using pivoting screens.

Said members may consist of electromagnetic devices such as electromagnets with polarized or non-polarized plunger core.

The control system may comprise release or adjustment members consisting, for example, of switches, reversing switches, photo-electric cells, or movement detectors responsive or operatively connected to the steering and/or suspension members of the vehicle.

Other features and advantages of this invention will appear as the following description proceeds with reference to the accompanying drawings, in which:

FIG. 4 is a sectional view of a modified form of embodiment of the device of this invention, wherein an actuator controls the light-source and mirror assembly.

Figure 1:
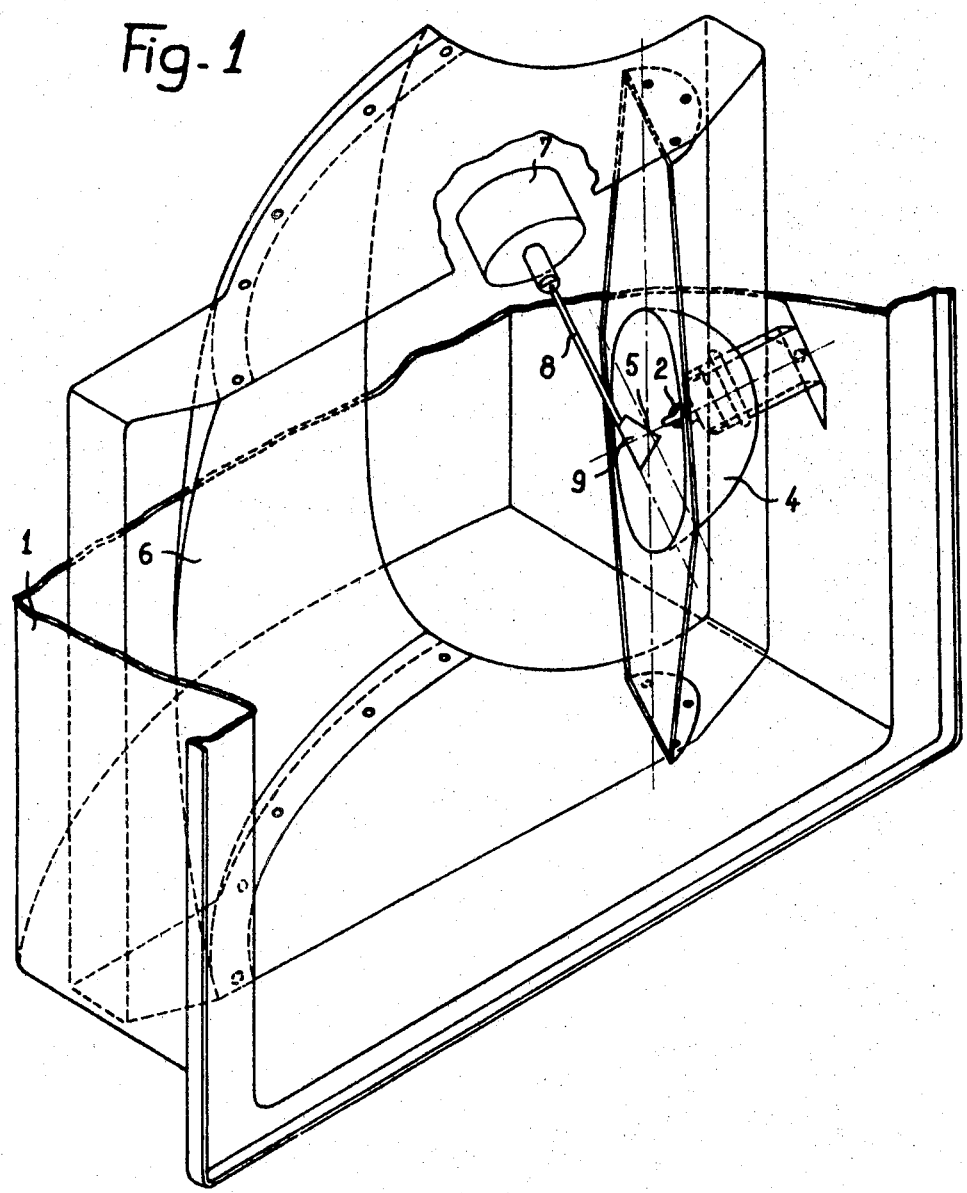
FIG. 1 is a perspective view of a first form of embodiment of the present invention, with an actuating member controlling a screen movable at the level of the real image.
Figure 2:
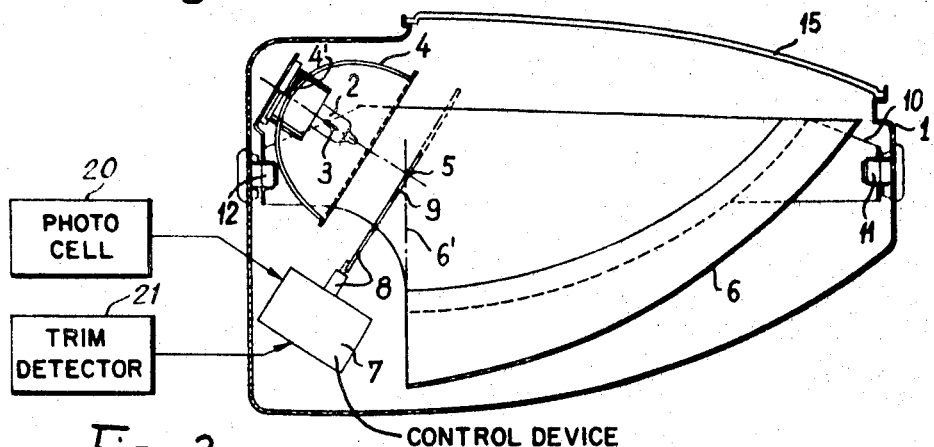
FIG. 2 is a horizontal section seen from above, showing the assembly comprising the light source and the elliptic and parabolic mirror mounted on a movable support.
Figure 3:
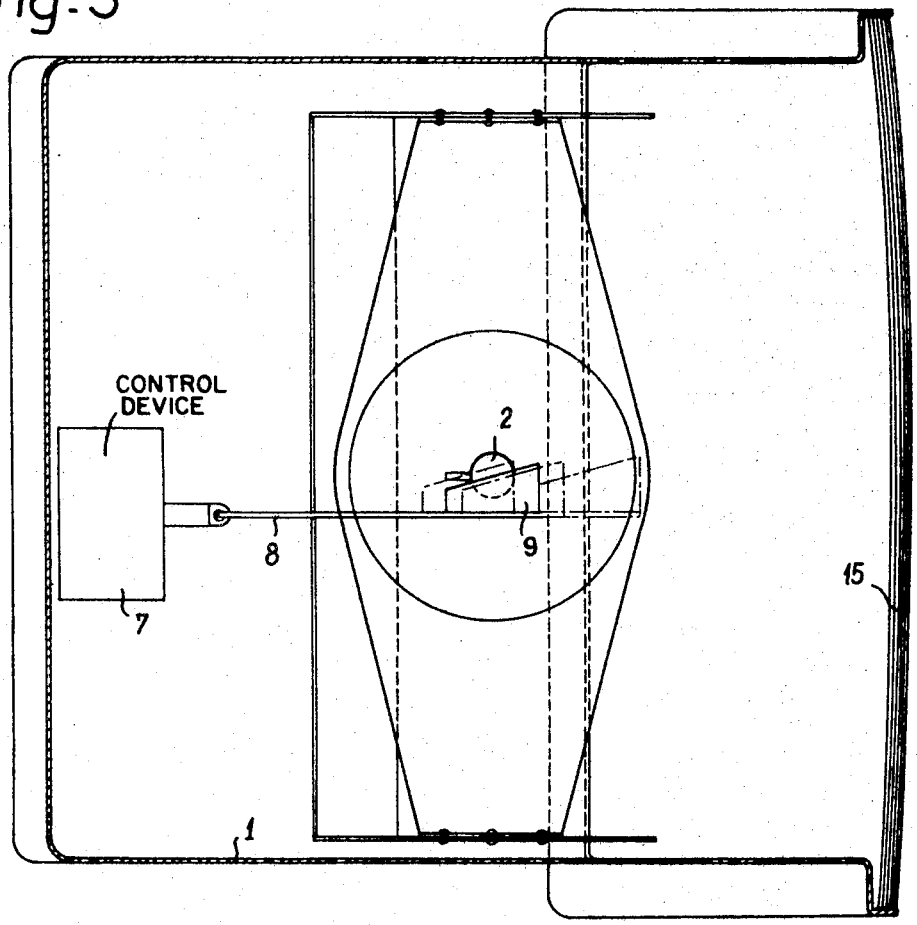
FIG. 3 is a sectional view of the headlamp in which the control device controlling the movement of the movable screen at the level of the real or actual image is shown in detail.

As shown more particularly in FIGS. 1, 2 and 3 the casing 1 of the headlamp according to this invention encloses a halogen or iodine lamp or bulb 2 of which the filament 3 is coincident with one of the foci of the elliptic mirror 4 having a bottom 4'. The other focus 5 of this elliptic mirror 4 is coincident with the focus of a portion 6 of a parabolic mirror located on one side only of a plane 6' containing the axis of revolution of the parabolic mirror and located at an angle of 45° with the axis of elliptic mirror 4. An electromagnetic control device 7, of relatively reduced dimensions, is adapted to control through any suitable and known connecting system 8 the movable screen 9 at the level of the real or actual image formed at the aforesaid second focus 5. It will be noted that the assembly 8, 9 has a very low inertia. The movement of screen 9 controlled by said electromagnetic control device 7 provides in a first version either only the change from the open-road lighting position to the dimmed or dipped lighting position and vice-versa, and in this case the control device 7 is operatively connected either to a control switch or dimmer mounted on the instrument panel. Alternatively a different device such as a photocell 20 adapted automatically to cut off the light beam as a function of the surrounding illumination may be used, notably when meeting other illuminated vehicles.

In a second version the control device 7 may be adapted to co-act with trim detector 21 for detecting the trim position of the vehicle in order, by properly moving the screen 9, to maintain the horizontal "cut-off" of the dimmed light at the optimum level for the momentary driving conditions while safely precluding the possibility of dazzling drivers of on-coming vehicles.

Referring now more particularly to FIGS. 2 and 4, it will be seen that the assembly comprising the light source and the elliptic and parabolic mirrors is mounted on a movable support 10 pivoting about trunnions 11 and 12 carried by the casing 1. By using a powerful actuator 13 it is thus possible to cause the assembly connected to said support 10 to pivot through the medium of any suitable means, such as links 14, as a function of the variations in the trim of the vehicle, as provided by trim detector 21' so that the best possible illumination is obtained from the dual point of view of driving convenience and safety. The advantageous feature characterizing this second actuator lies in the possibility of automatically adjusting each type of illumination by means of the headlamps. However, in the dimmed or dipped position the response time will obviously be somewhat slower due essentially to the greater mass to be displaced.

Moreover, when it is desired to obtain the best optical quality of the light beam, the glass and the casing of the movable system may be combined into a single unit; the actuator 13 may then be disposed outside said casing 1 and must have a greater force.

According to an improved but forcibly more complicated form of embodiment requiring a double adjustment of the servo or like automatic means, the control device 7 may be used for maintaining the horizontal cut-off line of the dipped or dimmed light beam irrespective of the vehicle trim, the actuator 13 being used for automatically adjusting the open-road light beam.

According to this invention, it is also possible, by using one or a plurality of diaphragms, shutters or like means, or one or more screens disposed at the level of the actual image and responsive to small actuators similar to the aforesaid device 7, to control the cross-sectional area of the desired light beam. This arrangement may be associated as suggested hereinabove with a device of the photo-electric type for producing an automatic control as a function of the surrounding illumination.

Of course, the control system is fed from a source of current such as the storage battery of the motor vehicle, and equipped if necessary with intermediate elements well known in the art, such as relays, amplifiers or electronic circuits interposed between the switches, reversing or dipper switches, pick-ups, etc., on the one hand, and the actuators, on the other hand.

Of course, many modifications and variations may be applied to the specific forms of embodiment of the present invention which are shown and described herein, without departing from the scope of the invention as defined in the appended claims.

What is claimed as new is:

1. An adjustable lighting device for a motor vehicle with a light source having only one filament; an elliptic mirror of revolution having an eccentricity of between 0.4 and 0.6 and first and second foci, said first focus being closer to the bottom of said elliptic mirror than said second focus and substantially coincident with the filament of said light source, a real image of said filament contained within a sphere being formed substantially at the location of said second focus; a portion of a parabolic mirror of revolution having a parameter $p$ in the range 2 to 6 inches, said portion being located on one side only of a plane containing the axis of revolution of said parabolic mirror, said plane being parallel to the direction of the light rays reflected by the parabolic mirror and located at an angle of 45° with the axis of said elliptic mirror, the focus of said parabolic mirror being substantially coincident with the second focus of said elliptic mirror so that it reflects the light rays issuing from said real image in a direction substantially parallel to the axis of revolution of said parabolic mirror, a masking member positioned at the second focus of said elliptic mirror, said masking member being controllable to vary the surface area of said real image and comprising a movable screen responsive to a control device for changing from open-road light to dipped or dimmed light, and vice-versa.

2. A lighting device according to claim 1 wherein said masking member consists of a movable screen, and which further comprises trim detector means responsive to the trim of the vehicle and a control device coupling said trim detector means to said movable screen, said control device displacing said movable screen in accordance with the output of said trim detector means, said trim detector means becoming operative when the device operates under dimmed or dipped light beam conditions.

3. A lighting device according to claim 2 which further comprises a photocell sensitive to the surrounding lighting conditions coupled to said control device, said control device displacing said movable screen in accordance with the outputs of said trim detector means and said photocell.

4. A lighting device according to claim 1 which further comprises a photocell sensitive to the surrounding lighting conditions, a control device responsive to said photocell, and at least one actuator coupling said control device to said masking member, said masking member being displaced in accordance with the output of said photocell.

5. An adjustable lighting device for a motor vehicle comprising a headlamp casing; a light source having only one filament; an elliptic mirror of revolution having an eccentricity of between 0.4 and 0.6 and first and second foci, said first focus being closer to the bottom of said elliptic mirror than said second focus and substantially coincident with the filament of said light source, a real image of said filament contained within a sphere being formed substantially at the location of said second focus;

a portion of a parabolic mirror of revolution having a parameter $p$ in the range 2 to 6 inches, said portion being located on one side only of a plane containing the axis of revolution of said parabolic mirror, said plane being parallel to the direction of the light rays reflected by the parabolic mirror and located at an angle of 45° with the axis of said elliptic mirror, the focus of said parabolic mirror being substantially coincident with the second focus of said elliptic mirror so that it reflects the light rays issuing from said real image in a direction substantially parallel to the axis of revolution of said parabolic mirror;

at least one masking member positioned at the second focus of said elliptic mirror, said masking member consisting of a movable screen;

a control device coupled to said masking member for changing the position of said screen;

means for supporting within said casing an assembly comprising said light source, screen, control device, and the elliptic and parabolic mirrors, said supporting means being movable about a pair of fixed trunnions carried by said casing; and an actuator coupled to said assembly, said actuator displacing said assembly to adjust the illumination provided by said lighting device as a function of the variation of the trim of said vehicle.

6. A lighting device according to claim 5 which further comprises a photocell sensitive to the surrounding lighting conditions coupled to said control device for displacing said masking member in accordance with the output of said photocell.

7. A lighting device according to claim 1 wherein said masking member consists of a movable screen and which further comprises a casing containing said elliptic and parabolic mirrors, light source, screen and control device coupled to said screen; actuator means located outside of said casing and coupled thereto; and trim detector means coupled to said actuator means for displacing said casing in accordance with the output of said trim detector means when changing from the open-road lighting conditions to the dimmed or dipped lighting conditions, and vice-versa.

8. A lighting device according to claim 7 which further comprises a photocell sensitive to the surrounding lighting conditions, a control device responsive to said photocell, said masking member being displaced in accordance with the output of said photocell.

9. A lighting device according to claim 6 wherein said control device acts with a relatively fast response time and said actuator is relatively more powerful than said control device.

* * * * *